United States Patent
Swales et al.

(10) Patent No.: US 6,445,982 B1
(45) Date of Patent: Sep. 3, 2002

(54) REGENERATIVE DECELERATION FOR A HYBRID DRIVE SYSTEM

(75) Inventors: Shawn H. Swales, Canton, MI (US); Gurinder S. Kahlon, Canton, MI (US); James J. Klocinski, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/817,870

(22) Filed: Mar. 26, 2001

(51) Int. Cl.⁷ .............................. H01M 8/00; B60K 1/00
(52) U.S. Cl. ...................... 701/22; 307/9.1; 307/10.6; 318/139; 318/383; 318/376; 320/104
(58) Field of Search ...................... 701/22; 320/104; 307/9.1, 10.6, 10.7; 303/152, 121, 121.04; 318/383, 376, 139

(56) References Cited

U.S. PATENT DOCUMENTS

| | | | | |
|---|---|---|---|---|
| 3,908,130 A | * | 9/1975 | Lafuze | 290/31 |
| 3,937,974 A | * | 2/1976 | Lafuze | 290/38 R |
| 4,117,736 A | * | 10/1978 | Kemper et al. | 417/222.1 |
| 4,199,037 A | * | 4/1980 | White | 180/65.3 |
| 4,473,752 A | * | 9/1984 | Cronin | 123/179.27 |
| 4,514,092 A | * | 4/1985 | Pritchard et al. | 222/64 |
| 4,605,310 A | * | 8/1986 | Pritchard et al. | 366/142 |
| 4,826,467 A | * | 5/1989 | Reese et al. | 474/14 |
| 5,337,848 A | * | 8/1994 | Bader | 180/65.2 |
| 5,616,056 A | * | 4/1997 | Hans-Michael | 440/3 |
| 6,011,377 A | * | 1/2000 | Heglund et al. | 318/254 |
| 6,267,107 B1 | * | 7/2001 | Ward | 123/162 |

* cited by examiner

Primary Examiner—William A. Cuchlinski, Jr.
Assistant Examiner—Olga Hernandez
(74) Attorney, Agent, or Firm—Brinks Hofer Gilson & Lione

(57) ABSTRACT

A control system is provided for the drive system of automotive vehicles. A control determines a combination of torque to be applied from an integrated starter-generator and compression torque to be applied from an engine. The combination of the integrated starter-generator torque and engine compression torque results in a desired deceleration torque. The control preferentially applies torque from the integrated starter-generator over the compression torque, thus maximizing regeneration.

33 Claims, 3 Drawing Sheets

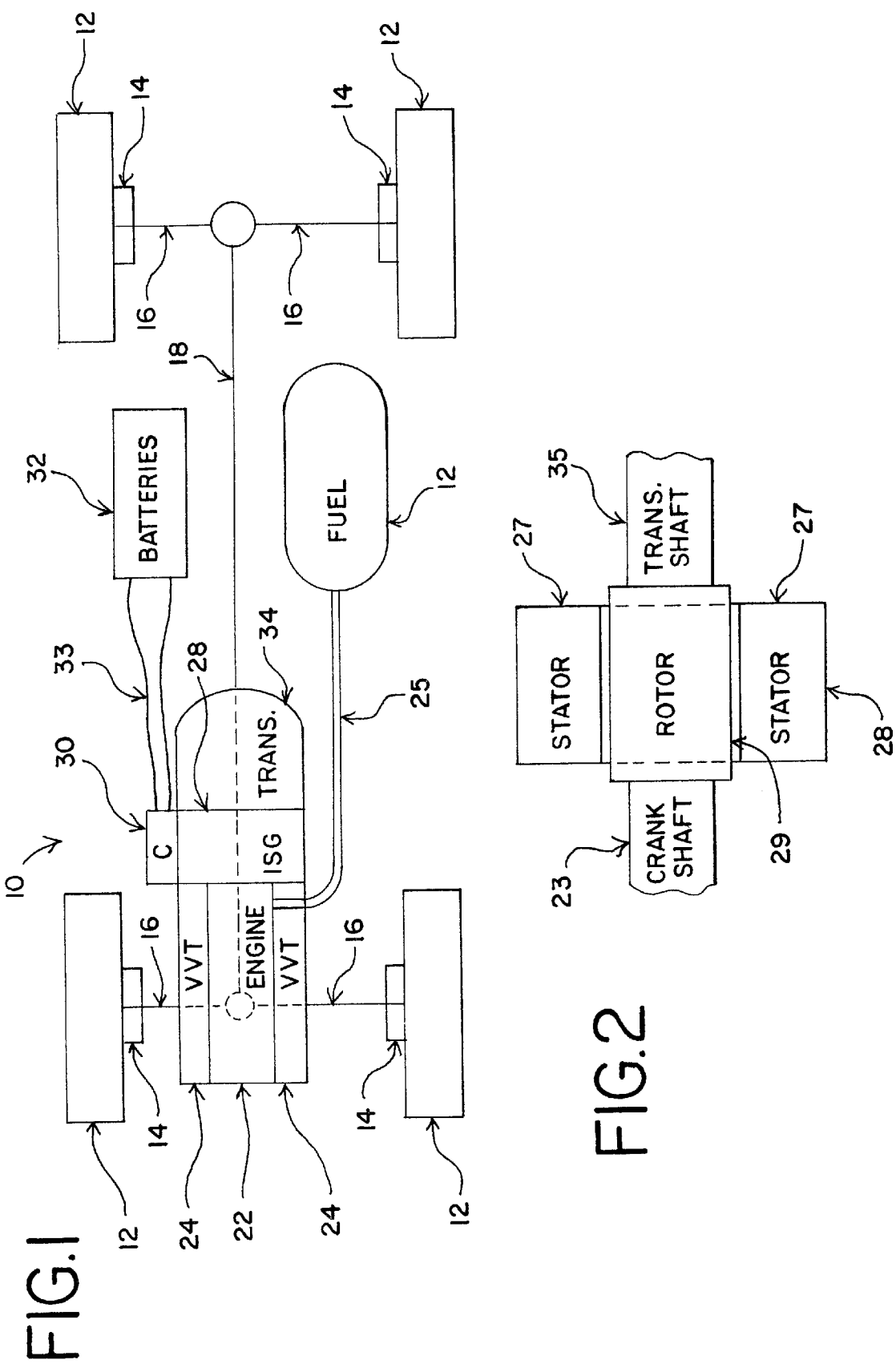

REGENERATIVE DECELERATION FOR A HYBRID DRIVE SYSTEM

BACKGROUND

Due to a growing market demand for automotive vehicles that are fuel efficient and environmentally friendly, automotive vehicle manufacturers increasingly are devoting a substantial portion of their research resources on fundamentally new technologies. Much of this research has focused on the internal combustion engine, which is used in the vast majority of automotive vehicles currently produced.

Although the internal combustion engine is inexpensive, reliable, easy to refuel and provides the desired performance, it is desirable to reduce the consumption of fossil fuels and emissions of these engines. To further address these concerns, manufacturers are also focusing their research on other areas of the automotive vehicles, such as braking systems and other drivetrain components.

As a result of this research emphasis, the automotive industry has developed a number of alternative drive systems for powering automotive vehicles. Generally speaking, a range of different concepts have been developed for automotive drive systems. At one end of this spectrum of available drive systems is the conventional drive system which uses an internal combustion engine that directly drives a standard automatic or manual transmission. At the other end of the spectrum is the electrical vehicle concept. Electrical vehicles operate completely on electrical energy stored on board, but generated elsewhere from fossil fuel or other sources. Typically, the drive system of an electrical vehicle uses a large electrical drive motor for torque generation and large capacity batteries for electricity storage. Some critics of conventional internal combustion engine drive systems prefer the concept of electrical vehicles because the electrical drive motor emits no polluting exhausts. Electrical automotive vehicles have generally been unsuccessful in the marketplace, however, because they can only travel short distances before the batteries must be recharged. In addition, the recharging process usually lasts several hours.

In response to the disadvantages of electrical vehicles, manufacturers of automotive vehicles have developed the concept of hybrid drive systems. This drive system typically includes both an internal combustion engine powered by fossil fuel and an electrical motor powered by electricity. The goal of hybrid drive systems is to combine the advantages of conventional internal combustion engine drive systems with the advantages of electrical drive systems. Thus, the optimal hybrid drive system desirably is capable of traveling long distances with good drive performance while requiring only a short amount of time to refill with fuel or recharge the batteries. Additionally, the drive system may be fuel efficient and environmentally friendly.

The concepts of hybrid drive systems are generally defined by two categories. In one category, referred to as high storage hybrids, the electrical drive system acts as the dominant system and the internal combustion engine provides supplemental power when needed. These systems typically include a large electrical motor and large capacity batteries similar to an electrical vehicle but also include a small internal combustion engine. The internal combustion engine provides additional power when extra acceleration is desired and can be used to generate electricity for longer distance travel. In the other hybrid category, referred to as low storage hybrids, this combination of drive systems is reversed. The internal combustion engine acts as the dominant system and the electrical drive system provides supplemental power. In this type of system fuel efficiency is increased by using a smaller internal combustion engine than is typically used in conventional automotive vehicles. However, drive performance remains similar to conventional drive systems since the electrical drive system provides assist power when needed. The electrical drive system can also be used in a regeneration mode to divert torque from the drivetrain to generate electricity for recharging the batteries. Low storage hybrid drive systems may be more readily acceptable to consumers as an alternative to conventional drive systems. One reason for this acceptance is that consumers typically demand drive performance and vehicle behavior equal to or similar to what they have experienced with current automotive vehicles.

Typically, an integrated starter-generator ("ISG") is used for the electrical drive system in low storage hybrid drive systems. Several different versions of ISGs are available; but generally speaking, the ISG is connected to the drivetrain of the automotive vehicle between the internal combustion engine and the wheels. Accordingly, the ISG is usually capable of functioning like a motor to generate drive torque from electricity stored in the batteries. Alternatively, the ISG is able to generate electricity from drive system torque. Thus, at least four different modes of operation of the ISG are possible. In the first mode, the ISG supplies torque to the engine to turn the crankshaft during starting of the engine. The ISG acts like a conventional starter in this mode; therefore the need for a standalone starter is eliminated. In the second mode, the ISG diverts some of the torque produced by the engine during normal operation in order to generate electricity. The electricity is then used to recharge the batteries and for powering the various electrical components used throughout the automotive vehicle. In this mode the ISG acts similarly to a conventional alternator, thus eliminating the need for a standalone alternator. In the third mode, the ISG draws electricity from the batteries to supply torque to the drivetrain during heavy loading. This mode enhances drive performance of the automotive vehicle by improving acceleration or allowing the engine to operate at lower average speed and higher average load for improved thermal efficiency. In the fourth mode, the ISG generates electricity from torque supplied by the drivetrain. This mode is sometimes referred to as regenerative braking or regenerative deceleration. In effect, this mode allows the automotive vehicle to recapture energy that is normally lost by conventional drive systems during deceleration, or slowing, of the vehicle.

Several problems are commonly encountered with the regenerative deceleration mode in currently available low storage drive systems. For example, the ISG causes the automotive vehicle to decelerate at an inconsistent rate between different deceleration events of the vehicle. This problem occurs because the torque applied by the ISG changes depending on the amount of electricity stored in the batteries and the electricity being used by the vehicle's electrical components. When the batteries are very low and capable of receiving a lot of electricity, the ISG applies more torque to generate more electricity. When the batteries are fully charged, the ISG applies very little torque, if any, for electricity generation. This variance in torque is undesirable because the driver can not predict the rate at which the vehicle will slow down.

Another problem is that the ISG typically produces an unfamiliar deceleration behavior. In conventional drive systems, deceleration of the vehicle is provided by either wheel brakes or from compression braking when the drivetrain rotates faster than the equilibrium speed of the engine. Compression braking commonly occurs when the driver lets off of the gas pedal or when the vehicle is coasting down a hill. In these situations, compression is produced in the engine cylinders of the internal combustion engine by the rotating pistons, thereby resulting in a consistent and predictable slowing of the automotive vehicle.

Hybrid drive systems employing regenerative braking are currently unable to produce a deceleration behavior that is similar to conventional drive systems. The deceleration torque experienced by the driver no longer varies predictably depending on vehicle speed, engine speed and transmission setting as inherently happens in conventional drive systems. Like the inconsistent deceleration behavior that results from varying electricity demands, consumers can find this difference between hybrid and conventional drive systems inconvenient and disconcerting. The deceleration behavior of hybrid drive systems is also complicated further by the fact that the internal combustion engine, which continues to be used as the dominant power source, also produces deceleration due to conventional compression braking in addition to the deceleration produced by the ISG.

BRIEF SUMMARY OF THE INVENTION

Accordingly, a control system is provided for decelerating a vehicle at a predictable rate while optimizing regeneration of the deceleration torque. The control system receives input data, including a desired deceleration torque, an integrated starter-generator ("ISG") torque capacity, and a compression torque capability of an internal combustion engine. The control then changes a setting of the ISG and a setting of a variable valve timing system ("VVT") to achieve the desired deceleration torque. The torque applied by the ISG is maximized and the compression torque of the engine is minimized to increase efficiency of the regenerative deceleration mode.

BRIEF DESCRIPTION OF THE DRAWINGS

The invention, including its construction and method of operation, is illustrated more or less diagrammatically in the drawings, in which:

FIG. 1 is a schematic view of one embodiment of an automotive vehicle with a low storage hybrid drive system;

FIG. 2 is a cross-section schematic view of one embodiment of an integrated starter-generator;

DETAILED DESCRIPTION

Figure 3:
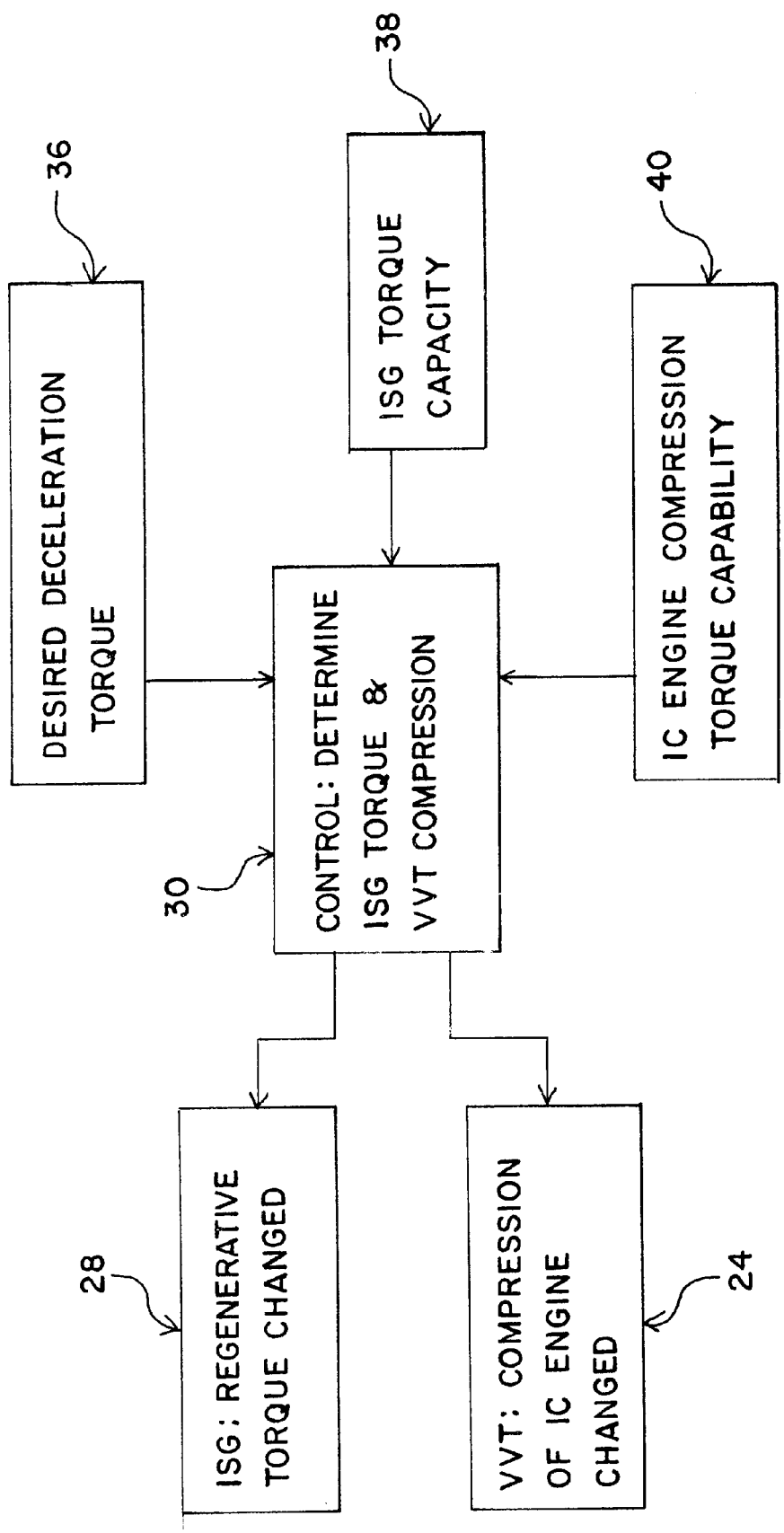
FIG. 3 is a flow chart of one embodiment of operation of a control system.

Referring now to the drawings, and particularly to FIGS. 1 and 2, a control system is provided for automotive hybrid drive systems. The control system uses a number of sensors to constantly monitor characteristics of the automotive vehicle 10 during deceleration of the vehicle 10. A control then calculates adjustments for an integrated starter-generator ("ISG") 28 and a variable valve timing system ("VVT") 24 to achieve a deceleration behavior that is both efficient and acceptable to the driver. The control system is described herein in relation to low storage hybrid drive systems. However, the principles of this control system may be beneficial in other drive systems, such as high storage hybrid drive systems or non-hybrid electrical systems.

FIG. 1 shows an automotive vehicle 10 with a low storage hybrid drive system. The hybrid drive system uses a conventional internal combustion engine 22 as the dominant source of drive torque for moving the vehicle 10. An ISG 28 supplements the power of the engine 22 and converts torque into electricity.

A typical example of a conventional automotive vehicle has a six cylinder engine with 4.0 liters of cylinder capacity. The electrical system in this vehicle usually is set to run at 14 volts, and the load rating of the battery is 40–50 amp-hr. A starter is required to start the engine in this vehicle, and a 1.0 kW alternator is typically used to provide electricity. A comparable example of a low storage hybrid vehicle 10 uses a smaller six cylinder engine 22 with a capacity of about 3.2 to 3.5 liters. The smaller engine 22 results in improved efficiency, while driving performance remains similar to the conventional vehicle due to power assist by the ISG 28. Usually, the electrical system voltage is increased to 42 volts or higher because of the increased use of electricity throughout the vehicle 10. The capacity of the battery 32 is also increased by about four times for greater electricity storage. Thus, although the load rating of the battery 32 remains at about 40–50 amp-hr, the voltage supply of the battery 32 is now 42 volts or higher instead of 14 volts. Because the ISG 28 produces electricity to power the electrical system similar to an alternator, the alternator is eliminated in the hybrid vehicle 10. Additionally, the ISG 28 can perform the same starting function of a conventional starter, thus the starter is also eliminated from the hybrid vehicle 10.

Internal combustion engines 22 use a number of pistons that reciprocate inside of cylinders in the engine 22, thereby rotating and driving a crankshaft 23. The engine 22 is powered by fossil fuel and air mixed together and ignited in the cylinders. Normally, a fuel tank 26 is provided for storing the fossil fuel, with fuel lines 25 supplying the fuel to the engine 22. The flow of fuel and air into the cylinders is controlled by valves that reciprocally open and close to feed and exhaust the cylinders and seal the cylinders during ignition. Therefore, the valves control the amount of compression that forms in the cylinders by sealing the cylinder during a portion of the cycle.

The engine 22 is also provided with the VVT 24. A variety of VVTs 24 are known to those skilled in the art, and any type of VVT 24 that can control compression is contemplated to work with the present invention. The VVT 24 allows the timing of the reciprocating valves to be varied during operation of the vehicle 10. A number of technologies have been used to accomplish variable timing of the valves, including mechanical systems, hydraulic systems, electrical systems and various combinations thereof. In one embodiment, an electrically powered VVT 24 is provided. In the electrical VVT 24, each valve is actuated by a separate electrical solenoid. The solenoids are then controlled by a control system that controls the timing of the valves.

As is understood by those in the art, the VVT 24 varies the compression produced in the cylinders during operation of the vehicle 10. This ability allows automotive vehicle manufactures to improve both performance and efficiency of the vehicle 10 in a number of ways. Generally speaking, internal combustion engines 22 operate most efficiently with a high compression ratio. Thus, for example, a compression ratio of 10:1 is often used in automotive vehicles 10. However, the optimum compression ratio for a particular vehicle 10 varies depending on several factors, such as the temperature of the engine 22, the atmosphere and the level of load on the engine 22. The compression ratio also causes a braking effect of the vehicle 10 when the drivetrain is rotating faster than the coasting equilibrium point of the engine 22. In this situation, a high compression ratio produces a large drag torque that will tend to decelerate the vehicle 10. The deceleration is generally consistent and predictable. On the other hand, compression braking is an inefficient process for decelerating the vehicle 10 because the energy used to slow the vehicle 10 is turned into unusable heat in the engine 22. The heat is then dissipated and discarded.

Those skilled in the art will recognize that certain changes to engine operating parameters, such as spark timing, fuel injector timing, and throttle position may be required to achieve the benefits of this system, and further may improve the overall effectiveness of the system. The fact that these changes may be made does not limit the scope of the present invention.

In one embodiment, the crankshaft 23 of the engine 22 is connected directly to the ISG 28. In other embodiments, the ISG 28 is indirectly connected to the crankshaft 23 by locating the ISG 28 elsewhere in the drivetrain of the vehicle 10 and rotating the ISG 28 with a belt, chain or gear drive. Moreover, a variety of ISG 28 types that are capable of converting drive torque to electricity and electricity to drive torque may be used.

One type of ISG 28 is shown in FIG. 2. This ISG 28 has a rotor 29 directly connected to the engine crankshaft 23. The rotor 29 is also directly connected to a transmission input shaft 35. Accordingly, the rotor 29 rotates within a stationary stator 27 at the same rotational speed of the crankshaft 23 and transmission shaft 35.

The ISG 28 operates in four different modes. In the first mode, the ISG 28 rotates the crankshaft 23 during startup of the vehicle 10 until the engine 22 begins to operate self-sufficiently. In this mode, the ISG 28 draws stored electricity from the batteries 32 through connecting cables 33. In the second mode, the ISG 28 applies a torque load to the rotor 29 that is less than the engine torque provided by the crankshaft 23. The ISG 28 then converts this applied torque to electricity that is used to recharge the batteries 32 and to power various electrical components throughout the vehicle 10. The remaining engine torque that is not used by the ISG 28 drives the transmission shaft 35. In the third mode, electricity is drawn from the batteries 32 and is converted by the ISG 28 into a torque at the rotor 29. In this mode, the torque supplied by the ISG 28 assists the engine torque. Thus, the torque received by the transmission shaft 35 is the sum of both the engine torque and the ISG torque. In the fourth mode, the ISG 28 applies a torque to the transmission shaft 35 to decelerate the vehicle 10. This mode is often referred to as regenerative deceleration because a large portion of the energy used to slow the vehicle 10 is recaptured by the ISG 28. The ISG 28 converts the deceleration torque into electricity, which can then be stored in the batteries 32 or used by the electrical system. In alternative embodiments, fewer, additional or different modes are provided.

A control 30 determines when to convert torque into electricity and when to convert electricity into torque. Accordingly, the control 30 switches the ISG 28 between each of the various operating modes at the appropriate times depending on whether more torque or more electricity is needed.

The control 30 also varies the amount of torque or electricity that is produced at any particular moment. For example, in the torque assist mode, the amount of torque produced by the ISG 28, and consequently the amount of electricity drawn from the batteries 32, may be variable based on the capacity of the ISG 28 to provide torque and the driver's desire for power. As another example, in the regenerative deceleration mode, the amount of electricity produced, and consequently the torque load applied to the transmission shaft 35, also varies depending on the capacity of the ISG 28.

When the batteries 32 become fully charged, the electrical system of the vehicle 10 may no longer accept additional electricity from the ISG 28. The control 30 then reduces the amount of torque load applied to the rotor 29. A number of signals are routed to the control 30 to determine when electricity generation can be increased or should be decreased. For example, one signal indicates the charge in the batteries 32 to ensure that the batteries 32 are not overcharged. Another sensor measures the battery 32 temperature. Another sensor measures the voltage of the vehicle's electrical system to regulate the ISG 28 voltage in the desired range. A sensor also monitors the temperature of the ISG 28 to ensure that the ISG 28 does not overheat and damage, and another sensor measures the speed of the ISG 28.

The transmission input shaft 35 rotates the internal components of the transmission 34, thereby converting the rotating speed of the input shaft 35 to the desired output speed used by the wheels 12. The transmission 34 comprises any known or later developed transmissions, such as an automatic transmission, a manual or automated manual transmission or a continuously variable transmission. The output torque of the transmission 34 is distributed to the wheels 12 through drive shafts 18 and axle shafts 16, thereby rotating the wheels 12 and propelling the vehicle 10. Brakes 14 are also provided at each of the wheels 12 for slowing the vehicle 10.

FIG. 3 is a flow chart representing the operation of the control system. Three primary sources of input data 36, 38, 40 are provided for the control 30. The first source of data 36 is the desired deceleration torque 36. The desired deceleration torque 36 is a map, look up table or profile. The map is determined by the automotive vehicle manufacturer and is programmed into the control 30 or other storage medium. The driver may change the deceleration map based on individual preference in some embodiments. The output of the deceleration map may depend on one or more characteristics, such as engine speed, vehicle speed and the positions of the throttle and brake controls. Sensors are provided to monitor each of these characteristics, with the data being continuously, periodically or intermittently routed to the control 30.

The deceleration map represents the actual deceleration of the vehicle 10 that the driver experiences. In one embodiment, the deceleration map simulates the coasting behavior of the vehicle 10. In this embodiment, the wheel brakes 14 operate independently of the ISG 28 as an autonomous system. In alternative embodiments, the deceleration of the vehicle 10 due to actuation of the brake pedal is also incorporated into the function of the ISG 28. The deceleration map may be designed to produce a variety of deceleration behaviors. For example, in many low storage hybrid vehicles 10, consumers may prefer a deceleration map that mirrors the deceleration behavior of conventional vehicles. However, a more aggressive deceleration behavior may also be desirable to increase the amount of regenerative braking, thereby further improving efficiency. Alternatively, less aggressive deceleration may be used.

The second source of data 38 is the torque-capacity 38 of the ISG 28. As previously described, the amount of torque 38 that the ISG 28 applies is nonconstant and varies based on a number of factors. Accordingly, the ISG torque capacity 38 is a function of a number of characteristics, including the speed and temperature of the ISG 28, the state of charge and temperature of the batteries 32, and the electrical load of the vehicle's electrical components. Signals for each, or a subset of, these characteristics are provided, and the data is continuously provided to the control 30. The control 30 then uses the data from these signals to calculate the maximum torque 38 that the ISG 28 can provide to decelerate the vehicle 10.

The third source of data 40 is the compression torque capability 40 of the engine 22. As described above, the compression ratio of the engine 22 can be varied by the VVT 24. Accordingly, the compression torque capability 40 of the internal combustion engine 22 is a function of engine speed and the operating range of the VVT 24. Electrical VVTs 24 have an extended range of operation that allows the compression ratio to be reduced to zero compression and increased up to a maximum compression possible in the engine 22. Even at a setting of zero compression, a small amount of engine drag 46 may exist. Other VVTs 24, such as mechanical VVTs, may have a more restricted range and commonly are able to provide a range of compression ratios between 5:1 to 10:1.

The control 30 continuously monitors each of these data sources 36, 38, 40 and calculates the ISG torque to be applied and the setting of the VVT 24. The combination of the deceleration torque applied by the ISG 28 and the compression braking applied by the engine 22 equals the desired deceleration torque 36. For example, the ISG torque is set equal to the lesser of the ISG torque capacity 38 and the desired deceleration torque 36 minus the minimum engine drag torque 46. The VVT setting is then determined so that the compression torque applied by the internal combustion engine 22 is equal to the difference between the desired deceleration torque 36 and the applied ISG torque 38, 44. Next, the control 30 transmits signals to the ISG 28 and the VVT 24 to change the regenerative torque applied by the ISG 28 and the compression torque applied by the internal combustion engine 42. The control 30 continuously or periodically determines the correct ISG torque and VVT settings so that the ISG 28 and VVT 24 can be changed as needed. Thus, the driver experiences the predetermined deceleration behavior stored in the deceleration map regardless of the torque capacity 38 of the ISG 28.

Figure 4:
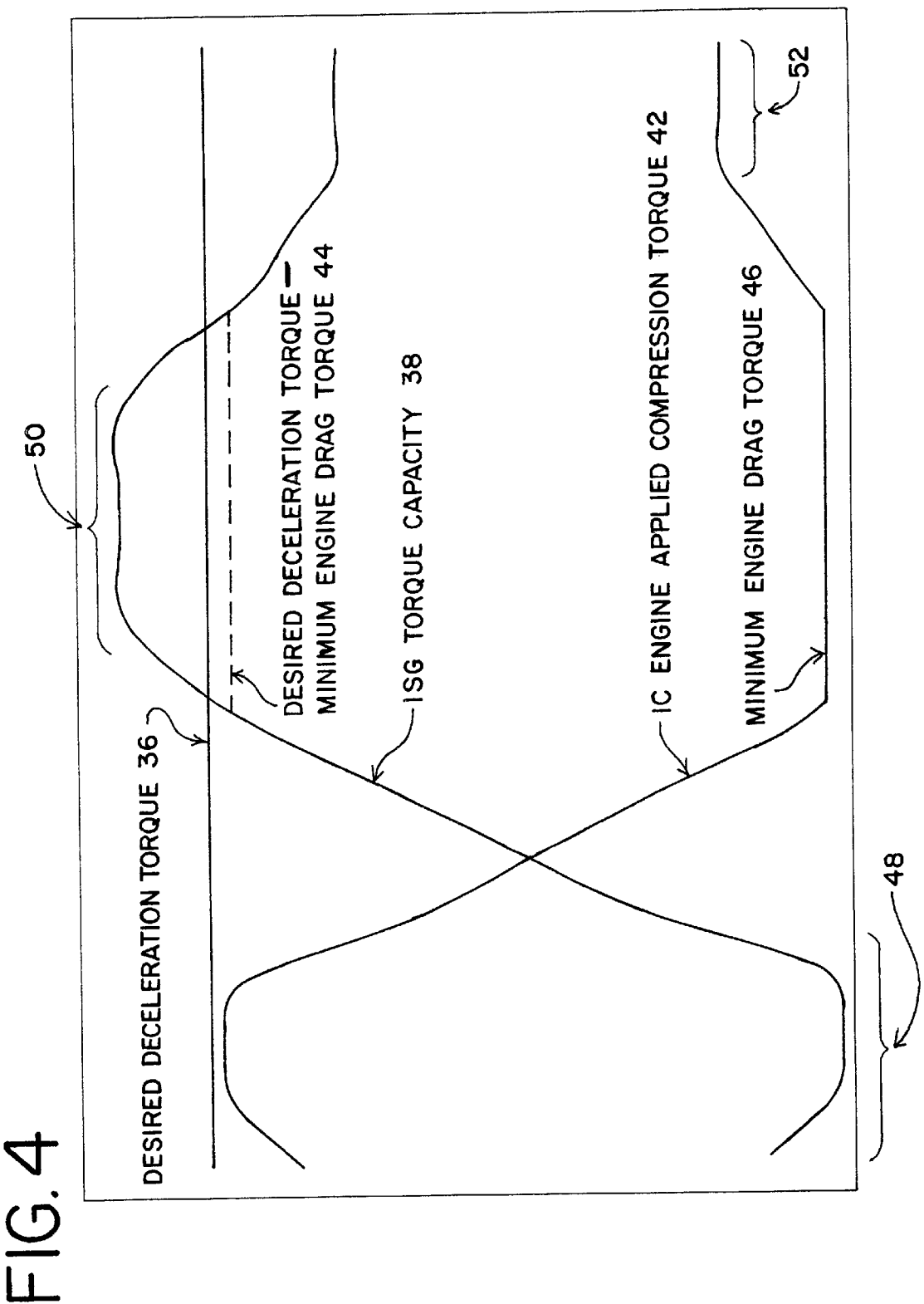
FIG. 4 is a chart showing torques used in one embodiment of the hybrid drive system during different stages.

FIG. 4 graphically shows a combination of the ISG torque capacity 38 and internal combustion engine applied compression torque 42 to achieve the desired deceleration torque 36. The desired deceleration torque 36 is shown as a fixed value for simplicity. However, the desired deceleration torque 36 may vary depending on the status of several characteristics as previously described. The chart shows three stages 48, 50, 52 for explanatory purposes. In stage 1 (48), the ISG torque capacity 38 is shown to be relatively low compared to the desired deceleration torque 36. This type of situation may occur when the batteries 32 are almost fully charged. A low ISG torque capacity 38 is also possible when the electrical components in the vehicle 10 are drawing a minimal amount of electricity. Cold temperatures also contribute to a low ISG torque capacity 38 due to poor charge acceptance of chemical batteries at lower temps 32. In some cases, the ISG torque capacity 38 may approach zero if the batteries 32 are fully charged. As seen in the chart, the VVT 24 sets the compression ratio of the engine 10 relatively high in this stage 48 to provide a high amount of engine compression torque 42. Thus, the sum of the ISG torque capacity 38 and the engine compression torque 42 equals the desired deceleration torque 36.

In stage 2 (50), the ISG 28 has a higher torque capacity 38. This situation occurs when the batteries 32 are low and capable of receiving a high rate of electrical charge and when the vehicle's electrical components are drawing more electricity. The ISG torque capacity 38 can exceed the desired deceleration torque 36 in some cases. As a result, the engine compression torque 46 is reduced. Thus, the sum of the ISG torque 44 and engine compression torque 46 remains equal to the desired deceleration torque 36. As previously described, when the ISG torque capacity 38 exceeds the difference 44 between the desired deceleration torque 36 and the minimum engine drag torque 46, the applied ISG torque 44 is reduced to this difference 44. In this situation, the VVT 24 sets the compression ratio of the engine 10 to the lowest value possible, thus maximizing regeneration of the deceleration energy. Other combination functions using the minimum or maximum ISG or engine torque may be used.

In stage 3 (52), the ISG torque capacity 38 is relatively high like stage 2 (50) but is less than the difference 44 between the desired deceleration torque 36 and the minimum engine drag torque 46. This situation represents a case when the batteries 32 and the electrical system are capable of receiving a relatively high level of electrical charge but not enough to absorb all the energy needed to decelerate the vehicle 10. Thus, as in the other stages 48, 50, the compression ratio of the engine 10 is adjusted so that the engine compression torque 42 contributes the additional torque needed to achieve the desired deceleration torque 36.

A consistent and predictable deceleration behavior is provided while also improving the efficiency of the regenerative deceleration mode. Accordingly, the vehicle 10 decelerates at a predetermine desired deceleration torque 36 regardless of the status of the batteries 32 or the electrical system. The control 30 then preferentially applies torque 38, 44 from the ISG 28 to maximize recovery of the energy used to decelerate the vehicle 10. The control 30 also adjusts the setting of the VVT 24 to change the compression ratio of the engine 10 so that the sum of the torque 38, 44 from the ISG 28 and the compression torque 42, 46 from the engine 10 equals the desired deceleration torque 36. Thus, the compression ratio of the engine 10 is minimized during deceleration to reduce unrecoverable energy losses that occur during compression braking.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A control system for regenerative braking, the control system comprising:

a control receiving sources of input data, said input data comprising a desired deceleration torque, an integrated starter-generator ("ISG") torque capacity, and an internal combustion engine compression torque capability; said control using said sources of input data to determine an ISG torque to be applied and an engine compression torque to be applied to achieve said desired deceleration torque, said determination preferentially applying said ISG torque; and said control transmitting signals based on said determination to said ISG and said engine thereby changing a torque applied by said ISG and changing a compression torque applied by said engine.

2. The control system according to claim 1, wherein said control continuously receives said sources of input data and continuously changes said ISG torque and said engine compression torque.

3. The control system according to claim 1, wherein said desired deceleration torque is predetermined.

4. The control system according to claim 1, wherein said desired deceleration torque comprises a deceleration map programmed in a storage medium, said deceleration map producing said desired deceleration torque based on deceleration sensors monitoring vehicle characteristics.

5. The control system according to claim 4, wherein said deceleration sensors comprise a sensor measuring engine speed, a sensor measuring vehicle speed, a sensor measuring throttle position, and a sensor measuring brake position.

6. The control system according to claim 1, wherein said ISG torque capacity is calculated as a function of ISG speed, ISG temperature, battery state of charge, battery temperature, and electricity draw of vehicle electrical components.

7. The control system according to claim 1, wherein said internal engine compression torque capability is calculated as a function of engine speed and an operating range of a variable valve timing system ("VVT").

8. The control system according to claim 1, wherein said internal combustion engine comprises a piston engine; and further comprising a variable valve timing system ("VVT").

9. The control system according to claim 1, wherein the ISG torque to be applied is the lesser of said ISG torque capacity and a difference between said desired deceleration torque and a minimum engine compression torque, said engine compression torque to be applied being equal to a difference between said desired deceleration torque and said ISG torque to be applied.

10. The control system according to claim 9, wherein said internal combustion engine comprises a piston engine; further comprising a variable valve timing system ("VVT"), said VVT operable to change a compression ratio of said engine thereby changing said engine compression torque; wherein said desired deceleration torque comprises a deceleration map programmed in a storage medium, said deceleration map producing said desired deceleration torque as a function of deceleration sensors monitoring vehicle characteristics; wherein said ISG torque capacity is calculated as a function of ISG speed, ISG temperature, battery state of charge, battery temperature, and electricity draw of vehicle electrical components; and wherein said internal engine compression torque capability is calculated as a function of engine speed and an operating range of said VVT.

11. The control system according to claim 10, wherein said control continuously receives said sources of input data and continuously changes said ISG torque and said engine compression torque; wherein said desired deceleration torque is predetermined; and wherein said deceleration sensors comprise a sensor measuring engine speed, a sensor measuring vehicle speed, a sensor measuring throttle position, and a sensor measuring brake position.

12. A hybrid drive system for an automotive vehicle, the hybrid drive system comprising:
   an internal combustion engine;
   a variable valve timing system ("VVT") connected with said engine;
   an integrated starter-generator ("ISG") electrically connected to a battery and an electrical system; and
   a control changing both a setting of said VVT and a setting of said ISG.

13. The hybrid drive system according to claim 12, wherein said control changes said VVT setting and said ISG setting during a regenerative deceleration mode in which deceleration power is converted to electrical power, said control preferentially setting the ISG to apply more torque and setting the VVT to apply less engine compression torque.

14. The hybrid drive system according to claim 12, wherein said control determines a combination of said ISG torque and said engine compression torque substantially equal to a desired deceleration torque.

15. The hybrid drive system according to claim 14, wherein said desired deceleration torque simulates coasting behavior of the vehicle, said coasting behavior not including braking deceleration performed by an autonomous braking system.

16. The hybrid drive system according to claim 14, wherein said ISG torque is the lesser of an ISG torque capacity and a difference between said desired deceleration torque and a minimum engine drag torque, said engine compression torque being a difference between said desired deceleration torque and said ISG torque.

17. The hybrid drive system according to claim 12, wherein said control changes said VVT setting and said ISG setting in response to sources of input data, said input data comprising a desired deceleration torque, an ISG torque capacity, and an engine compression torque capability, wherein said desired deceleration torque is produced from a deceleration map in response to sensors monitoring at least engine speed, vehicle speed, throttle position, and brake position, wherein said ISG torque capacity is responsive to sensors monitoring at least ISG speed, ISG temperature, battery state of charge, battery temperature, and electricity draw of vehicle electrical components, and wherein said engine compression torque capability is responsive to at least a sensor monitoring engine speed and an operating range of said VVT.

18. The hybrid drive system according to claim 12, wherein said VVT is an electrical VVT with solenoids actuating cylinder valves.

19. The hybrid drive system according to claim 12, wherein said VVT is an electro hydraulic VVT with hydraulic actuators controlling cylinder valves.

20. The hybrid drive system according to claim 12, wherein said ISG is mounted to said engine and to a transmission, said ISG comprising a stationary stator and a rotating rotor, said rotor being connected to a crankshaft of said engine and connected to an input shaft of said transmission.

21. The hybrid drive system according to claim 12, wherein said hybrid drive system is a low storage hybrid drive system whereby said internal combustion engine is the dominant power source and said ISG is a supplemental power source.

22. The hybrid drive system according to claim 20, wherein said control changes said VVT setting and said ISG setting during a regenerative deceleration mode in which deceleration torque is converted to electricity; wherein said control determines a combination of said ISG torque and said engine compression torque as a function of a desired deceleration torque; wherein said desired deceleration torque simulates coasting behavior of the vehicle; and wherein said ISG torque is the lesser of an ISG torque capacity and a difference between said desired deceleration torque and a minimum engine drag torque, said engine compression torque being a difference between said desired deceleration torque and said ISG torque.

23. The hybrid drive system according to claim 22, wherein said control changes said VVT setting and said ISG setting in response to sources of input data, said input data comprising a desired deceleration torque, an ISG torque capacity, and an engine compression torque capability, wherein said desired deceleration torque is produced from a deceleration map in response to sensors monitoring at least engine speed, vehicle speed, throttle position, and brake position, wherein said ISG torque capacity is responsive to sensors monitoring at least ISG speed, ISG temperature, battery state of charge, battery temperature, and electricity draw of vehicle electrical components, and wherein said engine compression torque capability is responsive at least a sensor monitoring engine speed and an operating range of said VVT; wherein said VVT is an electrical VVT with solenoids actuating cylinder valves; and wherein said ISG is mounted to said engine and to a transmission, said ISG comprising a stationary stator and a rotating rotor, said rotor being connected to a crankshaft of said engine and connected to an input shaft of said transmission.

24. A method of controlling a hybrid drive system in an automotive vehicle, the method comprising:

monitoring a torque applied by an integrated starter-generator ("ISG"); and changing a compression torque of an internal combustion engine in response to said ISG applied torque.

25. The method according to claim 24, wherein a combination of said ISG applied torque and said engine compression torque decelerates said vehicle at a predetermined desired torque.

26. The method of claim 24, wherein said combination of torques comprises a maximum torque capacity of said ISG and an additional engine compression torque providing said desired deceleration torque, said ISG applied torque being reduced from said maximum torque capacity to a difference between said desired deceleration torque and a minimum engine torque when said ISG torque capacity exceeds said difference.

27. The method of claim 24, wherein said desired deceleration torque simulates coasting behavior of the vehicle.

28. The method of claim 24, further comprising transferring torque with said ISG comprising a stationary stator and a rotating rotor, said rotor being connected to a crankshaft of said engine and connected to an input shaft of said transmission.

29. The method of claim 24, wherein said changing of said engine compression torque comprises changing a setting of a variable valve timing system ("VVT"), said VVT being an electrical VVT.

30. The method of claim 24, further comprising changing said ISG applied torque in response to at least ISG speed, ISG temperature, battery state of charge, battery temperature, and electricity draw of vehicle electrical components.

31. The method of claim 30, wherein said combination of torques comprises a maximum torque capacity of said ISG and an additional engine compression torque providing said desired deceleration torque, said ISG applied torque being reduced from said maximum torque capacity to a difference between said desired deceleration torque and a minimum engine torque when said ISG torque capacity exceeds said difference.

32. The method of claim 31, wherein said desired deceleration torque simulates coasting behavior of the vehicle; and wherein said hybrid drive system is a low storage hybrid drive system whereby said internal combustion engine is the dominant power source and said ISG is a supplemental power source.

33. The method of claim 32, further comprising transferring torque with said ISG comprising a stationary stator and a rotating rotor, said rotor being connected to a crankshaft of said engine and connected to an input shaft of a transmission.

* * * * *